F. B. WELLS.
COMBINATION VELOCIPEDE AND CART.
APPLICATION FILED JULY 2, 1912.
1,105,731.
Patented Aug. 4, 1914.
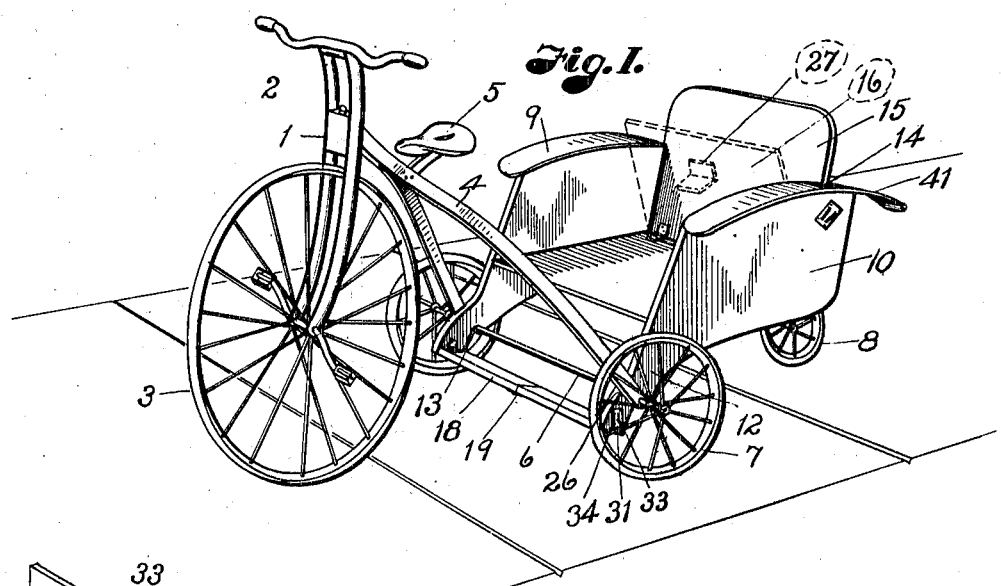
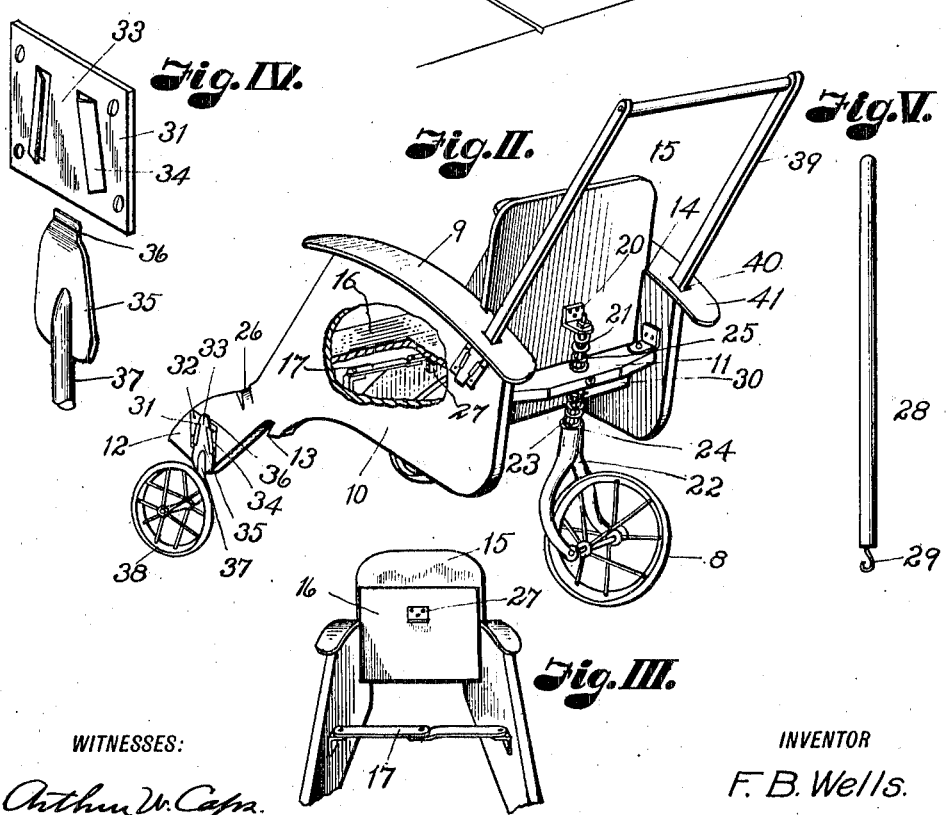
WITNESSES:
Arthur W. Capss.
Lewis L. Miller.
INVENTOR
F. B. Wells.
BY
ATTORNEY

UNITED STATES PATENT OFFICE.

FRANK B. WELLS, OF KANSAS CITY, MISSOURI.

COMBINATION VELOCIPEDE AND CART.

1,105,731.  Specification of Letters Patent.  Patented Aug. 4, 1914.

Application filed July 2, 1912. Serial No. 707,323.

*To all whom it may concern:*

Be it known that I, FRANK B. WELLS, a citizen of the United States, residing at Kansas City, in the county of Jackson and State of Missouri, have invented certain new and useful Improvements in Combination Velocipedes and Carts; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to children's velocipedes, and more particularly to a velocipede having a detachable rear seat for carrying an extra passenger, and has for its principal object to provide a rear seat, which, when removed, may be transformed into an independent vehicle by the attachment of certain parts.

It also consists of other new and improved details of structure, which will be more fully described, illustrated and pointed out in the appended claims, reference now being had to the accompanying drawings, wherein:—

Figure I is a perspective view of a velocipede constructed according to my invention. Fig. II is a rear perspective view of the detachable seat member, showing its use as an independent vehicle. Fig. III is a front perspective view of the seat member, showing the bracing and collapsing bar. Fig. IV is a dismantled view of the wheel and handle attaching means. Fig. V is a view of an auxiliary handle.

Referring more in detail to the parts:—1 designates a child's velocipede of ordinary construction, which comprises a handle bar 2, provided with a propelling wheel 3, and rear brace members 4 adapted to support the seat 5, axle 6 and wheel 7. Resting on the axle 6, and upon a rear wheel 8, is a detachable seat 9, which comprises side members 10 pivotally connected at the rear to a cross bar 11, and having downwardly and forwardly projecting portions 12 provided with notches 13 for resting on the axle 6. Slidably mounted in grooves 14 in the side members 10, is a back 15, having a seat member 16 hinged to the base thereof, and adapted to rest on a toggle bar 17, pivotally connected to the sides near the front. Hinged at the lower end of portions 12, is a foot rest 18 divided in the middle and provided with a hinge 19 adapted to open upwardly. Slidably and pivotally mounted in the cross bar 11, and in bracket 20 on the rear face of back 15 is the stem 21 of yoke 22 that carries the wheel 8. Immediately beneath cross bar 11, and surrounding stem 21, is a spring 23, which is adapted to bear against the underside of cross bar 11 and upon a shoulder 24 at the top of the yoke. Also resting on the top of cross bar 11 and beneath bracket 20, is another spring 25.

In assembling the device the seat is lifted, as shown in Fig. I, and the foot rest 18 and toggle 17 broken, to allow the front portions of the side members to be projected between the brace bars 4 of the velocipede, so that they may be supported on the rear axle 6. Notches 13 are then placed over the axle 6, and the sides moved outwardly, so that the braces 4 are projected into notches 26. The foot rest 18 is then pushed downwardly, the toggle 17 is straightened and seat 16 lowered so as to rest thereon, and so that bracket 27 will rest behind toggle 17 and hold it in position.

It is apparent that the seat 10 will be supported at the front by the axle of the velocipede, and at the rear by wheel 8, and that there will be enough flexibility between the two vehicles to allow for any irregularity in the roadway, that spring 23 will take up the jar of the vehicle, and that spring 25 will take up the jar of the seat 16, and also act as an auxiliary spring to the whole vehicle.

In order to assist the child in manipulating the vehicle, I have provided a handle 28, having a hook 29, which is adapted to take into an eye 30 on the cross bar 11, so that in descending steep hills, or crossing obstructions, the velocipede may be regulated by an older person in charge.

Referring now to the seat 10 when used as a separate vehicle, 31 designates brackets which may be secured to side members 10 by screws 32, and which are provided with tapered groove 33 formed by stamped ribs 34 from the body. One of these plates is secured to each of the portions 12, and another near the top of each of side member 10. The plates on portions 12 are each adapted to receive a tongue 35, having an inturned end 36, adapted to spring over the upper edge of the plate 31, and having a downwardly and laterally projecting shaft 37 upon which is revolubly mounted a wheel 38. The upper plate 31 is adapted to receive a tongue identical with the tongue 35, except that it is provided with a handle bar 39, which is further supported in apertures 40 in the guard pieces 41 that are secured to the top of side members 10.

It is apparent that the device, as shown in Fig. I, is a very practical toy and that by slight effort the velocipede can be detached and the seat converted into a go-cart.

Having thus described my invention, what I claim as new therein, and desire to secure by Letters-Patent, is:

1. The combination with a velocipede, having an exposed rear axle, of a trailer having notched members adapted to overlie the axle to support the trailer and couple same to the velocipede, for the purpose set forth.

2. The combination with a velocipede, of a trailer comprising downwardly and forwardly projecting members having downwardly facing notches on their rear edges adapted to overlie the rear axle of the velocipede, for the purpose set forth.

3. The combination with a velocipede, having an exposed rear axle, of a trailer comprising sides having front portions adapted for projection between the rear wheels of the velocipede and having notches adapted for receiving the axle, for the purpose set forth.

4. The combination with a velocipede, of a trailer comprising hingedly connected side and seat members, the latter having portions adapted for pivotal support on the rear axle of the velocipede, a toggle connecting the side members, and a foot rest comprising sections hingedly connected with each other and with the supporting portions of the side members, for the purpose set forth.

5. In a trailer for velocipedes, a frame comprising side members and a rear cross member pivotally connected with the side members, a toggle bar connecting the forward ends of said side members, a seat hingedly mounted between said side members and supported on said cross bar, and adapted to rest on and lock said toggle.

6. In a trailer for velocipedes a detachable mounting for wheels comprising a grooved plate and a tongued wheel member having a spring end adapted for engagement with the edge of said plate.

In testimony whereof I affix my signature in presence of two witnesses.

FRANK B. WELLS.

Witnesses:
IRENE COE,
LETA E. COATS.